United States Patent [19]

Selvarajan et al.

[11] Patent Number: 6,048,463

[45] Date of Patent: Apr. 11, 2000

[54] WATER CONTINUOUS METHYL ACRYLATE EMULSION POLYMER COMBINATIONS AND METHYL ACRYLATE EMULSION HOMOPOLYMERS FOR IMPROVED FLOCCULATION OF RED MUD IN THE BAYER PROCESS

[75] Inventors: Radhakrishnan Selvarajan, Downers Grove; Everett C. Phillips, Batavia, both of Ill.

[73] Assignee: Nalco Chemical Company, Naperville, Ill.

[21] Appl. No.: 09/074,706

[22] Filed: May 8, 1998

Related U.S. Application Data

[63] Continuation-in-part of application No. 08/991,103, Dec. 12, 1997.

[51] Int. Cl.$^7$ ...................................................... B01D 21/01
[52] U.S. Cl. ..................... 210/727; 210/733; 423/121; 423/122
[58] Field of Search ..................................... 210/725, 727, 210/728, 733, 734; 423/121, 122

[56] References Cited

U.S. PATENT DOCUMENTS

| | | | |
|---|---|---|---|
| 3,023,162 | 2/1962 | Fordyee et al. | 210/734 |
| 3,085,853 | 4/1963 | Lesinski et al. | 23/52 |
| 3,390,959 | 7/1968 | Sibert et al. | 23/143 |
| 3,397,953 | 8/1968 | Galvin et al. | 423/119 |
| 3,445,187 | 5/1969 | Sibert | 423/111 |
| 3,541,009 | 11/1970 | Arendt et al. | 210/728 |
| 3,681,012 | 8/1972 | Sibert | 23/143 |
| 3,755,531 | 8/1973 | Tsukawaki et al. | 423/121 |
| 3,975,496 | 8/1976 | Smalley et al. | 423/122 |
| 4,169,824 | 10/1979 | Kane | 423/111 |
| 4,283,507 | 8/1981 | Phillips et al. | 525/344 |
| 4,545,902 | 10/1985 | Connelly et al. | 210/734 |
| 4,678,585 | 7/1987 | Brownrigg | 210/727 |
| 4,767,540 | 8/1988 | Spitzer et al. | 210/728 |
| 4,879,333 | 11/1989 | Frazee | 524/460 |
| 5,008,089 | 4/1991 | Moody et al. | 423/121 |
| 5,217,620 | 6/1993 | Mahoney et al. | 210/728 |
| 5,286,391 | 2/1994 | Malito et al. | 210/733 |
| 5,346,628 | 9/1994 | Sommese et al. | 210/734 |
| 5,534,235 | 7/1996 | Reed et al. | 423/121 |
| 5,601,726 | 2/1997 | Cole | 210/727 |
| 5,620,796 | 4/1997 | Kawabata et al. | 524/745 |
| 5,710,226 | 1/1998 | Lau | 526/200 |
| 5,773,542 | 6/1998 | Koudate et al. | 526/215 |
| 5,788,867 | 8/1998 | Pearson | 210/733 |
| 5,847,056 | 12/1998 | Rothenberg et al. | 525/380 |

FOREIGN PATENT DOCUMENTS

| | | |
|---|---|---|
| 3033 | 10/1996 | Australia. |
| 54-4986 | 1/1979 | Japan. |
| 2 080 272 | 7/1980 | United Kingdom. |
| WO 96/05146 | 2/1996 | WIPO. |

OTHER PUBLICATIONS

"Flocculation and Sedimentation of Red Mud", 1980 pp. 39–50, TMS Light Metals Committee @109th AIME Annual Meeting Feb. 24–28, 1980.

"Expansion Coefficients and Conformational Properties of Heterodisperse Poly(acrylamide–co–sodium acrylate)", K.J. McCarthy, et al. (Journal of Applied Polymer Science, vol. 33, 1683–1698 (1987).

"Viscosity–Molecular Weight Relationships and Unperturbed Dimensions of Linear Chain Molecules" M. Kurata et al., Polymer Handbook 3$^{rd}$ Edition, 1989, Wiley–Interscience Publication.

*Primary Examiner*—Peter A. Hruskoci
*Attorney, Agent, or Firm*—Michael B. Martin; Thomas M. Breininger

[57] ABSTRACT

The present invention is directed to the clarification of red mud-containing liquors generated in the Bayer process for the recovery of alumina from bauxite ore with a combination of high molecular weight emulsion polymer and lower molecular weight emulsion polymers. The invention is also a method for the same purpose utilizing a methyl acrylate emulsion homopolymer.

11 Claims, No Drawings

WATER CONTINUOUS METHYL ACRYLATE EMULSION POLYMER COMBINATIONS AND METHYL ACRYLATE EMULSION HOMOPOLYMERS FOR IMPROVED FLOCCULATION OF RED MUD IN THE BAYER PROCESS

This application is a continuation-in-part of copending application Ser. No. 08/991,103 entitled "Water Continuous Methyl Acrylate Emulsion Polymers For Improved Flocculation Of Red Mud In The Bayer Process" filed on Dec. 12, 1997, by inventors Radhakrishnan Selvarajan and Everett C. Phillips.

FIELD OF THE INVENTION

The present invention is directed to the clarification of red mud-containing liquors generated in the Bayer process for the recovery of alumina from bauxite ore with a combination of high molecular weight emulsion polymer and lower molecular weight emulsion polymers. The invention is also a method for the same purpose utilizing a methyl acrylate emulsion homopolymer.

BACKGROUND OF THE INVENTION

The Process

In the Bayer process for the production of alumina, bauxite ore is pulverized, slurried in water, and then digested with caustic at elevated temperatures and pressures. The caustic solution dissolves oxides of aluminum, forming an aqueous sodium alumninate solution. The caustic-insoluble constituents of bauxite ore (referred to as "red mud") are then separated from the aqueous phase containing the dissolved sodium aluminate. Solid alumina trihydrate is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where, under high pressure and temperature, about 98% of the total available alumina is released from the ore as caustic-soluble sodium aluminate. After digestion, the slurry passes through several flash tanks wherein the pressure of the digested slurry is reduced from several atmospheres to one atmosphere and the temperature of the slurry is reduced from about 200°C. to about 105° C.

The aluminate liquor leaving the flashing operation contains from about 1 to about 20 weight percent solids, which solids consist of the insoluble residue that remains after, or is precipitated during, digestion. The coarser solid particles may be removed from the aluminate liquor with "sand trap" cyclones. The finer solid particles are generally separated from the liquor first by settling and then by filtration, if necessary. The slurry of aluminate liquor leaving the flash tanks is diluted by a stream of recycled washer overflow liquor. Any Bayer process slurry taken from the digesters through any subsequent dilution of the slurry, including the flash tanks, but before the primary settler, is referred hereinafter as the primary settler feed.

Normally, the primary settler feed is thereafter fed to the center well of the primary settler, where it is treated with a flocculant. As the mud settles, clarified sodium aluminate solution, referred to as "green" or "pregnant" liquor, overflows a weir at the top of the primary settler and is collected. This overflow from the primary settling tank is passed to the subsequent process steps.

The clarity of the primary settler overflow is crucial to the efficient processing of alumina trihydrate. If the aluminate liquor overflowing the settler contains an unacceptable concentration of suspended solids (at times from about 10 to about 500 mg of suspended solids per liter), it must be further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

The settled solids of the primary settler are withdrawn from the bottom of the settler ("underflow") and passed through a countercurrent washing circuit for recovery of sodium aluminate and soda. Overflow water from this washing circuit is recycled as primary settler feed and dilutes the slurry as it leaves the flash tanks.

The partial separation of the red mud solids from the pregnant liquor in the primary settler is expedited by the use of a flocculant. This initial clarification of the pregnant liquor is referred to as the primary settler stage. Flocculating agents, such as inverse emulsion liquid polymers, dry polymers and polysaccharides including starch, are commonly used to improve the separation of insolubles by increasing the rate at which the solids settle, by reducing the amount of residual solids suspended in the liquor, and by decreasing the amount of liquor in the settled solids phase. Flocculation performance is highly important in the primary settling stages. Red muds are comprised chiefly of iron oxides (at least about 50 weight percent of the red mud solids), together with silicon oxides, calcium oxides, sodium alumino-silicates, titanium oxides and other material, and commonly represent from about 5 to about 50 weight percent of the materials of the bauxite ore. Generally these muds are comprised of very fine particles, which hinder the desired rapid and clean separation of red mud particles from the solubilized alumina liquor. If the rate of separation is too slow, output is materially diminished and overall process efficiency is impaired. If the separation is not clean, the resultant solubilized aluminate liquor will require a more extensive treatment to remove residual solids, and/or the alumina trihydrate recovered will contain levels of impurities that are undesirably high for many end-uses.

Conventional Treatments

The polysaccharides, starch and dextran were used early in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process. Other types of polymers found to have utility include polymers formed from polymerization of vinyl amine or vinyl formamide as disclosed in U.S. Pat. No. 5,346,628; phosphonic acid polymers as disclosed in U.S. Pat. No. 5,534,235; and polymers containing hydroxamic acid groups in U.S. Pat. No. 4,767,540.

Another approach to Bayer process treatments is the combination of polysaccharides with synthetic polymeric flocculants. For example, U.S. Pat. No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process, contains at least about 80 weight percent of the acrylic acid mer unit, and has a molecular weight in excess of 50,000, and preferably in excess of 100,000. Other starch/polymer combinations are disclosed in U.S. Pat. Nos. 3,397,953; 3,541,009; 3,681,012; and 5,008,089.

Emulsions of polymers formed from lower primary alkyl acrylate monomers for refining alumina are disclosed in U.S. Pat. No. 3,755,531. Moreover, Unexamined Japanese Patent No. 4986 - 1979 discloses a process for producing an ultra high molecular weight acrylic acid copolymer salt. However, the polymers described herein are copolymers of significantly higher MW than either of these two references, and result in surprisingly greater activity than those lower molecular weight polymers previously disclosed by the Japanese references.

A process for improving the flocculation of suspended red mud solids in a Bayer process liquor comprises a water-continuous dispersion containing a polymer dispersed in the water of the continuous phase of said dispersion, the polymer comprised of at least 50 mole percent of mer units having pendant groups that hydrolyze to pendant carboxylic acid groups is disclosed in U.S. Pat. No. 5,286,391. However, this reference suggests that because the in-situ hydrolysis occurs over time and results in continuous activation, that the optimal polymer would be one containing 100 mole percent of mer units having pendant hydrolyzable groups. By contrast, this invention discloses that there is an optimal degree of hydrolysis (not 100%), that occurs in the range of 70–80%.

Difficulties Associated with Conventional Treatments

Oil continuous liquid flocculants (hereafter termed o/c flocculants), and powder flocculants (together represent 'synthetic flocculants'). Synthetic flocculants have been used to flocculate suspended red mud, as described above. Polysaccharides including starches have also been used to flocculate suspended red mud, as described above. Such flocculating agents are added in the primary settler, the mud washing circuit, mud dewatering systems (including centrifuges, vacuum filters, etc.) and to enhance mud stacking in mud disposal sites.

Prior to the successful introduction of synthetic high molecular weight polymers, polysaccharides including starch were used to settle red mud. Today, starch is still used alone in some refineries but starch is more commonly added in conjunction with high molecular weight synthetic flocculants. In these cases starch improves supernatant liquor clarity, improves the interface between the settled mud and the cleaner supernatant liquor, and reportedly helps to maintain mud bed stability of the settled mud in settlers and washers.

Red mud underflow is removed from the primary mud settler to a wash stage via an underflow pumping mechanism. Similar mud pumping is used in the mud washers, etc. In the wash stage, sodium aluminate and soda are recovered from this red mud. However, starch occasionally produces a red mud which has poor rheology, and, hence, has undesirable underflow characteristics. When starch is used, a mud is sometimes produced which has poor rheology and poor underflow characteristics. If not diluted, the underflow can occasionally become difficult to pump.

The water in oil (inverse) emulsion flocculants must be inverted prior to application so that the flocculant is contained in the water phase of the emulsion. If the inverse emulsion flocculants are added neat (non-inverted), the polymer flocculants will not disperse in the Bayer liquor, and poor activity will be encountered. In light of the above problems with the inverse emulsions, it would be an advance in the art of Bayer process treatments to eliminate the need for the inverse emulsions.

Moreover, oil continuous liquid flocculant of sodium or ammonium acrylate are largely used in bauxite industry for settling the red mud. Since the oil continuous liquid flocculants contain about 25–30% of paraffinic oils as the carrier, the liquor from which alumina separates out becomes enriched with an ever increasing amount of organic material. Since organics in the liquor inhibit the precipitation of alumina, a flocculant containing the least amount of the organic material would be most desirable.

While dry polymers reduce the level of organics added to the Bayer liquor, they also are not without concerns. The dry polymers are hygroscopic and must therefore be handled, stored and prepared without exposing the dry polymer to moisture or humid air. Once a dry polymer has been exposed to moisture or humidity, severe system plugging and loss of activity will result. System plugging and loss of activity results in major costs to the user in terms of the cost of the non-usable dry polymer, disposal of the contaminated dry polymer, lost alumina production, increased maintenance costs, etc. Dry polymer storage, solution make-up and feeding equipment must be very elaborate to prevent these problems. Dry polymers are also difficult to dissolve in water, with 90%+ polymer hydration requiring mixing and aging time of the solution to be as high as 2 hours. This slow dissolution requires that the user have large inventories of solutions in 2 separate tanks. The first tank is the high mixing energy tank where dissolution occurs. The second tank is the working solution tank from which the polymer solution is drawn and fed into the process.

Accordingly, it would be advantageous to provide a new flocculating agent which would expedite the separation of the red mud solids from the pregnant liquor, improve the clarity of liquor overflow, be easy to handle and feed into the process, decrease flocculant usage, and eliminate starch.

SUMMARY OF THE INVENTION

The present invention is directed to the clarification of red mud-containing liquors generated in the Bayer process for the recovery of alumina from bauxite ore with a combination of high molecular weight emulsion polymer and lower molecular weight emulsion polymers. The invention is also a method for the same purpose utilizing a methyl acrylate emulsion homopolymer.

DESCRIPTION OF THE INVENTION

Bayer process liquors generally are aqueous media containing dissolved sodium aluminate and red mud solids at various concentrations. Such liquors include the primary settler slurry or feed, which contains high concentration levels of both red mud and dissolved sodium aluminate, the red mud washing slurries, which have high red mud concentrations but lesser concentrations of sodium aluminate and total alkalinity, and the secondary clarification liquors, which are rich in dissolved sodium aluminate but contain much less red mud than the other types of liquors. Additional liquors include red mud slurries which are dewatered in centrifuges or on vacuum drum or disc filters, as well as red mud slurries which are flocculated to improve their mud stacking properties or to improve the tendency to release water from the mud slurry. As discussed above, the separation of the red mud from the sodium aluminate and its aqueous phase is continued from the primary settlement stage until concentrated red mud is eliminated from the process circuit, and from the primary settlement stage until the clarified liquor is subjected to the alumina trihydrate crystallization.

The flocculation of red mud, which routinely precedes or follows either settling or filtration, is most difficult in the primary settlement stage because of the high concentration of fine particles, and the high concentration of total alkalinity. Improvement of the flocculation effectiveness in the primary settlement stage is extremely important to the entire Bayer process. By reducing the level of suspended solids that remain in the supernatant above the floc formed in the primary settler liquor, the solids to be removed during secondary clarification stages are reduced. Also, residual flocculant (both synthetic and natural red mud flocculants) in the supernatant liquor have been shown to severely reduce filtration flux in the secondary clarification stage.

In the Bayer process, the bauxite ore is digested under highly alkaline conditions, and the typical primary settler liquors are routinely highly alkaline, containing sodium or calcium hydroxide, sodium aluminate, and commonly sodium carbonate. The total alkalinity of the primary settler feed, that is the liquor charged to the primary settlement stage, is typically from about 100 to 300 grams per liter of settler feed, as sodium carbonate. The solids contents of typical primary settler feeds vary from about 25 to about 85 grams per liter of settler feed.

By primary settler feed is meant herein the Bayer process digested slurry as charged to the flash tanks or other vessels emptying into the primary settler. Such feed may be an admixture of the digested slurry plus dilution liquor, and the dilution liquor is routinely the counter current technique wash water from the red mud washing stages discussed above. The primary settler feed differs from the liquors or slurries subjected to clarification and/or separation in the secondary clarification stage or the red mud washing stages by composition as to the solids content, dissolved sodium aluminate content, and total alkalinity. The primary settler feed also differs from the liquors or slurries in that no insoluble fraction thereof has received an earlier flocculation treatment. An improved clarification of Bayer process primary settler liquors is the principle object of the present invention. Nonetheless in broad embodiment the present invention in directed to the clarification and settling of red mud-containing liquors in any aspect of mineral processing wherein such red mud is found. For example, the invention may be used in the counter-current wash liquors, primary settler liquors of the Bayer process, as well as addition to red mud which is dewatered in centrifuges or by vacuum filtration (drum filters, and disc filters among others) and red mud which is flocculated after the last mud washing stage to improve the mud stacking properties in the mud disposal area, or in addition to red mud which must be made useful for other purposes.

Upon flocculation of a primary settler feed, using the polymers of the invention, a liquor/mud interface will form where upon settling, the supernatant liquor is low in suspended solids (generally ranging from about 10 to about 500 mg/l) and overlies a mud layer. The lower mud layer contains the flocculated material, and as discussed above is comprised of both red mud solids (generally ranging from about 10 to about 70% mud solids by weight) and some amount of pregnant liquor. The overlying supernatant is the liquor that is separated for secondary clarification, again as discussed above. This supernatant is "mud-clear" and the interface between it and the mud layer is clearly seen in some cases, but the supernatant is not entirely free of suspended solids, appearing instead as a hazy, but transparent, liquid. The present invention diminishes the amount of suspended solids in such supernatant, and hence decreases the extent of secondary clarification required to obtain a given purity of sodium aluminate solution The present invention may also reduce or eliminate the need for starch by improved supernatant liquor clarity and improved red mud stability.

The digested slurry is typically discharged from the flash tanks at elevated temperatures. The primary settler feed is generally not further cooled before charging to the primary settlement stage other than the cooling which may occur when a digested slurry is optionally admixed with the liquor from the first red mud wash stage to form a primary settler feed. According to the invention, the flocculation of the primary settler feed is conducted at atmospheric pressures and at elevated temperatures of from about 80° or 90° C. to about 103° or 115° C.

One aspect of the invention is a method for treating Bayer process red mud-containing liquor comprising the steps of:

a) adding to said red mud-containing liquor an effective clarifying amount of a combination of poly(methyl acrylate/acrylic acid) emulsion copolymers, wherein said combination comprises i) a high molecular weight copolymer formed from monomers having a mole ratio of methyl acrylate to acrylic acid of from about 85:15 to about 99.9:0.1 and wherein said copolymer has an intrinsic viscosity in 2N $NaNO_3$ at 30° C. of at least 18 dL/g. and ii, a lower molecular weight copolymer formed from monomers having a mole ratio of methyl acrylate to acrylic acid of from about 85:15 to about 99.9:0.1 and wherein said copolymer has an intrinsic viscosity in 2N $NaNO_3$ at 30° C. of from about 5 to about 18 dL/g;

b) forming a red mud phase and a clarified liquor phase; and c) recovering said clarified liquor phase.

These polymers may be added at different times to different parts of the Bayer processing unit, though it is also possible to blend them together prior to addition. If added sequentially, the low molecular weight copolymer should be added before the high molecular weight copolymer.

The invention is also a method for treating Bayer process red mud-containing liquor comprising the steps of:

a) adding to said red-mud containing liquor an effective clarifying amount of a poly(methyl acrylate) emulsion homopolymer wherein said homopolymer has an intrinsic viscosity in 2N $NaNO_3$ at 30°C. of at least 15 dL/g;

b) forming a red mud phase and a clarified liquor phase; and c) recovering said clarified liquor phase.

The following information applies to any aspect of this invention. The high and lower molecular weight copolymers may be from about 60 to about 90 percent hydrolyzed in said red mud-containing liquor. Moreover the copolymers may be from about 75 to about 80 percent hydrolyzed in said red mud-containing liquor. The copolymers may have a mole ratio of methyl acrylate to acrylic acid of from about 90:10 to about 99.5:0.5. The copolymer may have a mole ratio of methyl acrylate to acrylic acid of 97.5:2.5. The copolymer may have an intrinsic viscosity in 2N $NaNO_3$ at 30° C. of from about 20 to about 40 dL/g. The ratio of low to high molecular weight copolymers when treated sequentially or as a blend is from about 50:50 to about 99:1 low molecular weight copolymer to high molecular weight copolymer. One useful blend is a 90:10 ratio. For either the homo polymer or the copolymer, the effective dosage will depend upon the particular system to be treated, but generally may fall in the range of from about 0.1 to about 10 ppm of each polymer.

The total alkalinity of the red mud containing liquor may be from about 10 to about 300 grams per liter expressed as sodium carbonate. The solids content of the red mud containing liquor may be from about 10 grams per liter to about 350 grams per liter. The treatment of the red mud containing liquor may be conducted at atmospheric or elevated pressures and at a temperature of from about 5° C. to about 250° C. Moreover, the treatment of the red mud containing liquor may be conducted at atmospheric pressure and at a temperature of from about 30° C. to about 115° C.

According to one preferred embodiment of the invention, polymers formed from acrylic acid and acrylic acid ester monomers ranging in composition from essentially 99% mer units of the acrylic acid ester monomer down to less than 50% mer units of acrylic acid ester monomer are used. Preferably, the molecular weights range from about 4 million to about 10 million. One feature of the polymers of the invention is the high molecular weights which produce high reduced specific viscosity (RSV) in the range of from 30 up to 60 dl/g.

The polymers of the invention are water continuous. In more detail, the polymers are dispersed in water (true emulsions), where water is the continuous phase. This directly contrasts what is found in inverse latex polymers where the polymer is dispersed in an oil phase and an inversion step is required before the polymers can be used as flocculants. According to the invention, the polymers may be added either neat or in solution (through hydrolysis) to the primary liquor feed of a Bayer process. Normally, oil continuous liquid synthetic flocculant emulsions are first inverted to about 0.5 to 3% in process or raw water and again diluted to about 0.01 to 0.4% as product in process or raw water before being introduced to the process (since a product generally range from 15 to 50% active polymer). Upon addition of the treatment polymer to the red mud-containing liquor, two phases form, a red mud phase and a clarified liquor phase. The treatment polymer mainly goes into the red mud phase.

One advantage of the neat addition of the polymers of the invention is improved settler overflow clarity. One unique feature of the invention is that when added neat or as a diluted emulsion, the water continuous polymers of the invention hydrolyze in situ in the Bayer process liquor itself. In more detail, the polymers formed from AA and acrylic acid esters are not themselves red mud flocculants, as they are entirely ineffective in flocculating red mud. However, when placed in the Bayer process liquor in the presence of red mud, the high alkalinity and the high temperatures hydrolyze the ester to form polymer acrylic acid ultimately. Furthermore, the composition of the invention does not hydrolyze instantly, but rather over time. Therefore, the poly AA/acrylic acid ester essentially is being activated continuously over time, ranging from the initial composition which is 100% ester for the ester portion down to eventually 100% active polyacrylic acid.

The present invention produces its surprising and unexpected results through the formation of micro-floccules of the polymer and the suspended solids; which produce a red mud which is more amenable to the bulk flocculation in the primary settler. The micro-floccules form as the polymers hydrolyze and become active toward the red mud. For this reason, the polymers are injected upstream from the primary settler, such as in one of the flash tanks or between the flash tanks and the primary settler feed well where there is sufficient temperature and residence time to allow the hydrolysis of the polymer. It should be noted that hydrolysis is not instantaneous. The hydrolysis will progress as the polymer and mud make their way from the flash tanks down the various piping and into the primary settler.

According to one embodiment of the invention, the invention is practiced as follows. The polymer is injected into the primary settler feed, preferably into one of the lines upstream from the primary settler or, preferably, in a flash tank where there is sufficient temperature. Also, the polymer can be added in the digesters themselves.

The red mud containing liquor may be a primary settler feed, a mud washer feed, or a centrifuge feed. The feed may be from a digester blow-off, diluted digester blow-off, primary settler underflow, washer underflow, or a combination of settler and washer underflows with other process streams including but not limited to washer overflows, lake return water or raw water. The polymers described herein, when utilized to treat Bayer process red-mud containing liquor, result in an increase in both clarity and settling rate.

The polymers may also be utilized to treat the last stage washer underflow at the mud disposal site to improve mud stacking, or more rapid release of liquor from the mud. Moreover, the polymers may also be utilized for the treatment of mud filters, including but not limited to drum and vacuum filters.

It is envisaged that these polymers will also have utility in the following areas of the Bayer process: classification, flocculation, precipitation and dewatering for either alumina trihydrate or solid phase oxalate.

The following examples are presented to describe preferred embodiments and utilities of the invention and are not meant to limit the invention unless otherwise stated in the claims appended hereto.

EXAMPLE 1

The following procedure was utilized to synthesize a high molecular weight poly (methyl acrylate/acrylic acid) in 94/6 mole ratio. In a 1 liter polymerization flask fitted with baffles, 552.9 g of deionized water, 19.84 g of nonylphenol ethoxylate sulfate ammonium salt (58% solution), available from Rhone-Poulenc of Cranbury, N.J., 17.44 g of Na dodecyl benzene sulfonate (23% solution) available from Rhone-Poulenc of Cranbury, N.J., 3.88 g of EO-PO block copolymer available from BASF, Mt. Olive, N.J. and 0.096 g EDTA tetra sodium salt were taken and a solution was effected by mixing. To the clear solution, 0.19 g of Sag 2001 an antifoam available from Witco of Greenwich, Conn. was added, nitrogen was sparged through the solution for 15 minutes and the solution was cooled down to 10° C.

Methyl acrylate (99%) 367.2 g, AA 19.19 g and formic acid 0.15 g were mixed in an addition funnel. A third of this mixture was added to the emulsifier solution in the reactor and the nitrogen sparge was continued for additional 10 minutes. Ferrous sulfate heptahydrate, 0.002 g, was dissolved in a mixture of sulfuric acid, 0.07 g, and water 6.9 g, and the potassium chlorate, 0.0019 g, was dissolved in water, 6.9 g. The initiator solutions were drawn into separate syringes and fitted into metered syringe pumps. The initiators were pumped in at a slow rate so as to maintain a constant reaction temperature, 10–13° C. When no more exotherm was seen, the initiator addition was stopped and another third of the monomer was added to the reactor. Polymerization was repeated as described above. Finally, the third lot of the monomer was added and completed the polymerization. After completing the polymerization, the reaction temperature was raised to 25° C. and held at that temperature for an hour so as to reduce the unreacted monomer level to <2%. The polymer was collected to determine the gel No. (100 mesh screen) and hydrolyzed in caustic at 1% emulsion concentration to determine the residual monomer by liquid chromatography (for acrylic acid) and the reduced specific viscosity/intrinsic viscosity/molecular weight. Polymers synthesized according to this general procedure are described in Table I.

EXAMPLE 2

Another procedure utilized to synthesize a high molecular weight poly(methylacrylate/acrylic acid) in 97.5/2.5 mole ratio is as follows: In a 1 liter polymerization flask deionized water, 606.75 g, ammonium nonylphenol ethoxylate sulfate (58%) 54.3 g available from Rhone-Poulenc of Cranbury, N.J. octylphenol ethoxylate (70%) 4.9 g available from Rhone-Poulenc of Cranbury, N.J., EO-PO block copolymer 4.8 g available from BASF of Mt. Olive, N.J., EDTA 0.2 g were weighed and mixed until a clear solution resulted. Then the silicone antifoam, 5 g, was added and nitrogen was sparged for 15 minutes with cooling down to 10° C.

Methyl acrylate (99%) 296.7 g, acrylic acid 6.3 g and formic acid, 0.15 g was taken into an addition funnel. A third of this mixture was added to the aqueous phase while nitrogen sparge was continued for 10 more minutes. Potassium chlorate, 0.0035 g was dissolved in 10.32 g of deionized water and the ferrous sulfate heptahydrate, 0.003 g was dissolved in sulfuric acid, 0.012 g, in water, 10.32 g. The initiator solutions were drawn into syringes and mounted onto separate syringe pumps. Polymers synthesized according to this general procedure are described in Table I.

EXAMPLE 3

Low molecular weight poly(methyl acrylate/acrylic acid) polymer was obtained by using a procedure similar to that of Example 2 except that substantial amounts of isopropyl alcohol were used as the chain transfer agent in the monomer phase. The aqueous phase consisting of the emulsifiers as describe in Example 2 was used. The monomer phase consisted of methyl acrylate (99%) 296.6 g, and acrylic acid, 6.3 g, with isopropyl alcohol, 16 g. Tertiary butyl hydroperoxide (70%) 0.005 g was diluted with water, 10.32 g and ferrous sulfate heptahydrate, 0.0035, was dissolved in sulfuric acid, 0.012 g, in water, 10.32 g. The solutions were fed using piston pumps as described above. The reaction was initiated at 20° C. and maintained at 20–25° C. The reaction was post heated at 40° C./1 hour. Representative products are described in Table I.

EXAMPLE 4

The synthesis of oil in water emulsion of poly(methyl acrylate) homopolymer was effected in the following manner. In a 1 liter polymerization flask fitted with baffles, 561.49 g of deionized water, 54.3 g of nonylphenol ethoxylate sulfate ammonium salt (58% solution), available from Rhone-Poulenc of Cranbury, N.J., 4.9 g of octylphenol ethoxylate(70%), available from Rhone-Poulenc of Cranbury, N.J., 4.8 g of EO-PO block copolymer available from BASF, Mt Olive, N.J., 0.1 g EDTA tetra sodium salt and sulfuric acid (0.02 g) were taken and a solution was effected by mixing. To the clear solution, 5.0 g of Sag 2001, an antifoam available from Witco of Greenwich, Conn. was added, nitrogen was sparged through the solution for 15 minutes and the solution was cooled down to 10° C.

The monomer, methyl acrylate (99%) 353.54 g, and formic acid 0.175 g were mixed in an addition funnel. A third of the monomer was added to the emulsifier solution in the reactor and the nitrogen sparge was continued for additional 10 minutes. Ferrous heptahydrate, 0.002 g, was dissolved in sulfuric acid, 0.07 g, solution in water 6.9 g, and the potassium chlorate, 0.0019 g, was dissolved in water, 6.9 g. The initiator solutions were drawn into separate syringes and fitted into metered syringe pumps. The initiators were pumped in at a slow rate so as to maintain a constant reaction temperature, 10–13° C. When no more exotherm was seen, the initiator addition was stopped and another third of the monomer was added to the reactor. Polymerization was repeated as described above. Finally, the third lot of the monomer was added and completed the polymerization.

After completing the polymerization, the reaction temperature was raised to 25° C. so as to reduce the unreacted monomer level to <2%. The polymer was collected to determine the gel No. (100 mesh screen) and hydrolyzed for 1 hr at 85° C. in caustic at 1% emulsion concentration to determine the residual monomer by liquid chromatography (for acrylic acid) and the reduced specific viscosity, intrinsic viscosity, and molecular weight The hydrolyzed MA homopolymer had an RSV of 28.3 dL/g. This polymer has a molecular weight of between 4.4 and $5.2 \times 10^6$.

Table I illustrates the properties of the polymers made by the synthetic schemes described in Examples 1 and 2, labeled as polymers 1–8. Polymers 1–6 and 8 were synthesized according to the procedure in Example 1. Polymer 7, was synthesized according to the procedure in Example 2, and polymers 9 and 10 according to the procedure in Example 3. For comparative purposes, polymers 9–10 represent polymers of the approximate molecular weight disclosed by the Japanese references, as described in Example 3.

TABLE I

Characterization of the new very high molecular weight oil-in-water emulsion polymers

| Polymer | pMA/AA, mole % | RSV[1] | IV[2] | IV[3] | Mw[4] (×10$^6$) |
|---|---|---|---|---|---|
| 1 | 94/6 | 50.7 | 32.5 | 32.0 | 8.13 |
| 2 | 94/6 | 49.1 | — | — | 7.82 |
| 3 | 94/6 | 44.7 | — | — | 7.19 |
| 4 | 94/6 | 37.1 | 23.6 | — | 5.86 |
| 5 | 94/6 | 34.4 | 23.0 | — | 5.71 |
| 6 | 94/6 | 34.3 | — | — | 5.65 |
| 7 | 97.5/2.5 | 30.0 | 20.9 | — | 5.18 |
| 8 | 94/6 | 26.3 | 17.8 | — | 4.4 |
| 9 | 97.5/2.5 | 21 | — | — | 3.6 |
| 10 | 97.5/2.5 | 14 | 11.4 | 12.7 | 2.8 |

[1]measured at polymer concentration as 0.04% p.AA in 2 N NaNO$_3$ at 30° C.
[2]in 2 N NaNO$_3$ at 30° C.
[3]in 1 N NaCl at 30° C.
[4]$\eta = 5.41 \times 10^{-6} [M_w]^{0.981}$ To determine that polymers 9 and 10 are equivalent to those of the Japanese references, the following procedure was utilized.

Methods practiced to characterize polymers are Reduced Specific Viscosity (RSV) and Intrinsic Viscosity (IV) measurements. The RSV measurement may be used indirectly to compare polymer molecular weight. If RSV versus polymer concentration is plotted and the linear curve is extrapolated to zero concentration (infinite dilute) the intercept is the IV. The IV value is used to estimate the viscosity average molecular weight of the polymer via the Mark-Houwink-Sakurada equation.

$\eta = k \, Mw^\alpha$ to which upon rearrangement gives viscosity average $Mw = [\eta/k]^{1/\alpha}$ where $\eta$ is the intrinsic viscosity and the coefficients k and $\alpha$ are constants for the particular polymer type, temperature and solvent system employed.

Upon complete hydrolysis of the methyl acrylate homopolymers (p.MA) or methyl acrylate/acrylic acid copolymers (p.MA/AA), a sodium acrylate polymer (p.NaAc) is formed. Thus, the coefficients $k=5.41 \times 10^{-6}$ and $\alpha=0.981$ for poly(sodium acrylate) in 1 M NaCl published by K. J. McCarthy, C. W. Burkhardt and D. P. Parazak (*J. Applied Polymer Science*, Vol. 33, pp 1683–1698, 1987) were used for molecular weight determinations in this work.

Reduced Specific Viscosity measurements were made using Cannon Ubbelohde semi-micro dilution viscometers (Size 75), at 30+ or 0.02° C. Unless noted, the RSV of all of the new oil-in-water polymers were determined at a constant polymer concentration, 0.04 wt % as p.AA, in a 2 N $NaNO_3$ solution (i.e., 17% $NaNO_3$). It is important to define these conditions, as the RSV value is dependent on polymer concentration and the concentration of salt. Thus, the intrinsic viscosity will also change with the solvent type and ionic strength used. For the anionic polymers considered in this work, for example, the IV value will increase as the ionic strength of the solvent is decreased (e.g., 1 N vs 2 N $NaNO_3$). Since there are no universal standards, great attention must be paid to (1) the conditions employed, and (2) the values used for the constants k and a in the Mark-Houwink-Sakurada equation, when comparing polymer molecular weights referred to in the literature or patents.

Tsukawaki and Inamoto (Kao Soap Co.) were the first to report the oil-in-water emulsion polyacrylates and the application of these in the Bayer process (U.S. Pat. No. 3,755,531). The Intrinsic viscosities of their methyl acrylate polymers varied from 1.6 to 7.4 as measured in acetone at 30° C. A polymer with IV of 3 dL/g in acetone, upon hydrolysis gave and IV of 5.5 dL/g in 2 N NaOH at 30° C. From this it may be extrapolated that the IV range for the Tsukawaki and Inamoto methyl acrylate polymers will be 2.9 to 13.6 in 2N NaOH.

It is essential to note that the solvent strength for Tsukawaki and Inamoto polymers is approximately half of that used for this invention (2 N NaOH=8.0% salt while 2 N $NaNO_3$=17% salt). Thus, the intrinsic viscosities of the Tsukawaki and Inamoto methyl acrylate polymers would be significantly lower, if performed in 2 N $NaNO_3$. For comparison purposes, the IV range of 2.9 to 13.6 dL/g for the Tsukawaki and Inamoto methyl acrylate polymers may be used to estimate molecular weights to compare them to the new polymers of this work.

Table I shows that the polymers disclosed herein have a molecular weight range of 4.4 to 8.1 million while the Tsukawaki and Inamoto polymers are significantly lower 0.69 to 3.3 million, a liberal estimate of the upper limit as in Table II.

The application of the Tsukawaki and Inamoto methyl acrylate polymers has also been reported by K. Yamada, T. Harato and Y. Shiozaki ("Light Metals", Presented at the 109th AIME Annual Meeting, Feb. 24–28, 1980). The polymers used therein were homopolymer of methyl acrylate (obviously obtained from Tsukawaki and Inamoto) having intrinsic viscosities of 3.5 and 5.6 in acetone at 30° C.

However, also reported is a 70/30 mol % sodium acrylate/methyl acrylate copolymer with an intrinsic viscosity of 8.7 dL/g in 2 N NaOH. Again, the intrinsic viscosity of this polymer would be lower if the measurement was made in 2 N $NaNO_3$ as performed for all polymers in this work. Thus, this polymer would have a molecular weight lower than 2.1 million, by the method utilized herein.

An additional Japanese patent application by T. Kotani et al. (Jun. 15, 1977) describes the synthesis of high molecular weight acrylate polymers of the methyl, ethyl and butyl esters. Therein, the high molecular weight polymers are reported to be in the range of 7–50 million, with a specific example of a polymer synthesized having a molecular weight of 27 million. However, this scale is based on molecular weight calculations in an organic system. The currently utilized technique for this sort of molecular weight determination is that the determination is done in an aqueous solvent. The numerical scale is thus dependent upon the solvent system utilized. With the physical constants described by Kotani et al, the Mark-Houink equation may be utilized along with the appropriate values for the constants $k=28.2 \times 10^{31\,3}$ and alpha=0.52 (as obtained from the *Polymer Handbook*) to obtain a molecular weight equivalent in terms of the scale utilized herein to only 0.2 million. Therefore, the ultra-high molecular weight polymers obtained at that time are far smaller than those disclosed herein. In fact, molecular weight of the polymers described herein by the analytical technique employing an organic solvent (as was done in Kotani et al) is not applicable to the polymers disclosed herein because the surfactant package and the extremely high MW polymer precipitate and contribute to an erroneous result under the conditions described in Kotani et al. This is further evidence that the polymers disclosed herein are of far greater molecular weight than those described in Kotani et al.

Table I shows that the polymers described herein are much larger than those previously described, as summarized in Table II. These results reveal that prior to this disclosure, "ultra high molecular weight" polymers of this type were considered to be up to and including molecular weights of only about 3 million. By contrast, this invention documents far larger polymers, which are much more active than those polymers of Table II. Example 5 illustrates that such novel, much higher molecular weight polymers in combination with lower molecular weight copolymers produce surprisingly greater settling rates and clarity in the Bayer process.

TABLE II

| Authors | Polymer Type | $\eta$(acetone) | $\eta$(2N NaOH) | Estimated Av. Mw $\times 10^6$ |
|---|---|---|---|---|
| Tsukawaki et al. | p(MA) | 3 | 5.5 | <1.3 |
|  | p(MA) | 1.6 to 7.8 | — | <3.3 |
|  | p(MA/MMA) | 3.8 to 4.1 | — | <1.83 |
| Yamada et al. | p(NaAc/MA) 70/30 mol % | — | 8.7 | <2.1 |
|  |  | — | — | — |

Activity tests reported herein were performed with the hydrolyzed poly sodium acrylate samples of the current invention, the true emulsion polymers. Hydrolysis was effected using 1% of the emulsion in 1% NaOH at 85° C. for 20 minutes.

The rate at which the new methyl acrylate polymers are hydrolyzed can be controlled by the mole ratio of caustic to polymer concentration and by the reaction temperature. As hydrolysis occurs, the polymers become more water soluble. T. Kotani et al. teach that no significant hydrolysis occurred on a 2% solution of polyacrylate latex sample at a caustic level of 0.5–1.0 (mol ratio of NaOH/acrylic ester), even at 100° C. over three hours. Viscosity measurements could not be obtained because their polymers were insoluble/nonhydrolyzable.

Hydrolysis of Samples 1 and 5 in Table I above, at 1%, were performed at a lower temperature, 85° C., and at a NaOH/methyl acrylate ester mole ratio of 1 for 1, 2 and 3 hours. Colloid titration was used to determine the anionic charge and the degree of hydrolysis. The Table III below summarizes the results.

TABLE III

| Polymer | Hydrolysis Time | % of Hydrolysis |
|---------|-----------------|-----------------|
| 1       | 1 hr            | 29              |
| 1       | 3 hr            | 51              |
| 5       | 1 hr            | 23              |
| 5       | 2 hr            | 43.5            |
| 5       | 3 hr            | 59              |

EXAMPLE 5

Settling Rate Test Procedure

The following general test procedure was utilized to obtain settling rate information. A well mixed sample of settler feed slurry (red mud obtained from a mineral processing facility) was portioned out into twelve 1000-ml Nalgene graduated cylinders by filling all the cylinders to the 500-mL graduation. The remaining 500-mL are then added to the cylinders in the opposite order. These cylinders were immediately placed in an oven or hot water bath thermostated to 100° C.

The 1000-mL sample was then transferred to a stainless steel pot and heated to 100° C. with a flame. The resulting slurry was transferred back to the 1000-mL graduated cylinder.

Next, the cylinder was immediately mixed by two plunges. The plunger was a 1/8" metal rod with a #10 rubber stopper attached to the bottom end. The plunger was allowed to fall freely on the downward stroke and lifted at the same speed on the upward stroke. To test a polymer, that polymer was added to the 1000 ml graduated cylinder and mixed with four plunges.

To determine settling rate, the time for the solid/liquid interface to travel between the 900 and 700 mL marks on the cylinder was recorded. After measuring the distance between the two marks, the settling rate could be calculated in (ft/hr) or (m/hr) units.

Based on this information, a replacement ratio (RR) may be calculated by plotting a graph with settling rate on the Y-axis and dose on the X-axis for each product tested. The dosage required to produce the desired plant settling rate is determined from the above graph. The replacement ratio is the dose of new polymer divided by the dose of conventional treatment needed to obtain the plant settling rate. If the RR value is below one, the product is superior, if it is one, it would be equivalent, and if it is above one it is poorer in activity.

Clarity Test Procedure

The following procedure was utilized for measurement of overflow clarity from red mud settling tests.

A clarity ratio is evaluated as a measure of the performance of the new polymer compared to conventional polymers. This is determined as the ratio of the overflow turbidity using the new polymer versus the turbidity of the overflow for the conventional flocculant at the same specific settling rate (i.e., the plant settling rate).

The clarity of the settler overflow was simulated by determining the solids, mg/L, in a sample of the liquor in the 1000 ml graduated cylinder after a specific time after settling, (e.g., 10, 30 or 60 min). The overflow solids may be determined gravimetrically by filtering a specific volume of liquor, washing the solids with hot water and drying the solids in an oven at 100 C. for 2–4 hours. Alternatively, the turbidity of the overflow liquor was measured as an indirect measure of the overflow solids. The turbidity was determined using a Hach Co. turbidimeter. If the turbidity of the overflow sample is over the range of the meter, then the sample may be diluted to a specific volume using a hot 30 wt. % NaOH solution (e.g., 5 ml of overflow combined with 10 ml of 30 wt. % NaOH solution).

The high molecular weight homopolymer synthesized according to the procedure of Example 4 was tested as described above to demonstrate flocculation capabilities, in comparison to a conventional treatment. The results are detailed in Table IV. Thus the p(MA) product gave comparable results to a conventional treatment as evidenced by a replacement ratio (based on polymer actives) of 1.3 and a clarity ratio near 1.0.

TABLE IV

Settling and Clarity Performance of a new poly(methyl acrylate) flocculant sample versus Conventional Treatment

| Flocculant Product | RSV (dL/g) | Polymer Actives (ppm) | Settling Rate (ft/hr) | Clarity @ 10 min (NTU) |
|--------------------|------------|-----------------------|-----------------------|------------------------|
| p(MA)[1]           | 28.3       | 1.33                  | 14.7                  | 598                    |
|                    |            | 1.60                  | 21.8                  | 604                    |
|                    |            | 1.86                  | 28.1                  | 583                    |
|                    |            | 2.13                  | 34.7                  | 540                    |
|                    |            | 2.66                  | 38.1                  | 542                    |
|                    |            | 2.93                  | 49.4                  | 559                    |
| p(NH$_4$Ac)[2]     | 32.0       | 0.98                  | 12.8                  | 654                    |
|                    |            | 1.63                  | 37.6                  | 540                    |
|                    |            | 1.95                  | 56.8                  | 442                    |
|                    |            | 3.25                  | 73.4                  | 416                    |

[1] = poly(methyl acrylate) prepared according to the procedure of Example 4
[2] = poly(ammonium acrylate) conventional treatment solution, polymer available from Nalco Chemical Company of Naperville, Illinois.

The copolymer combination of high and lower molecular weight p(MA/AA) copolymers was tested according to the procedures described above. The results are given in Table V. When a p(MA/AA) copolymer with RSV of 14–21 dl/g is applied first to the mud slurry followed by the addition of a small amount of the ultra high molecular weight p(MA/AA) polymer having RSV of 34–49 dL/g, overflow clarities can be improved by 40 to 70%.

TABLE V

Settling and Clarity Performance for single product
us combination of low and high molecular weight products

| Flocculant | Polymer[1] | RSV | Dose 1 (mL) | Dose 2 (mL) | Actives Dose (ppm) | Settling Rate (ft/hr) | Turbidity @ 10 min. (NTU) |
|---|---|---|---|---|---|---|---|
| p(NH$_4$Ac)[2] |  | 32 | 2.3 | 2.3 | 1.5 | 14.6 | 649 |
| p(NH$_4$Ac)[2] |  | 32 | 2 | 3 | 1.6 | 15.1 | 681 |
| p(NH$_4$Ac)[2] |  | 32 | 3 | 3 | 1.9 | 42.9 | 795 |
| p(MA/AA) | 5 | 34 | 3 | 3 | 1.9 | 13.6 | 1010 |
| p(MA/AA) | 5 | 34.5 | 3.5 | 3.5 | 2.2 | 27.6 | 1326 |
| p(MA/AA) | 5 | 34.5 | 3.5 | 3.5 | 2.2 | 23 | 1238 |
| p(MA/AA) | 5 | 34.5 | 4 | 4 | 2.5 | 30.5 | 1195 |
| p(MA/AA) | 5 | 34.5 | 4 | 4 | 2.5 | 48 | 1319 |
| p(MA/AA) | 5 | 34.5 | 4 | 3 | 1.9 | 29.1 | 852 |
| p(MA/AA) | 9 | 21 | 8 | 8 | 5.4 | 14.4 | 248 |
| p(MA/AA) | 9 followed by 5 | 21/34 | 10 | 1 | 3.7 | 18.6 | 399 |
| p(MA/AA) | 9 followed by 5 | 21/34 | 15 | 1 | 5.4 | 22.4 | 383 |
| p(MA/AA) | 9 followed by 5 | 21/34 | 20 | 0.5 | 6.9 | 29.2 | 187 |
| p(MA/AA) | 9 followed by 5 | 21/34 | 20 | 0.5 | 6.9 | 31.5 | 411 |
| p(MA/AA) | 10 | 14 | 12 | 12 | 7.9 | 7.9 | 217 |
| p(MA/AA) | 10 followed by 5 | 14 | 10 | 2 | 3.9 | 9.8 | 262 |
| p(MA/AA) | 10 followed by 5 | 14 | 16 | 1 | 5.6 | 17.1 | 224 |
| p(MA/AA) | 10 followed by 5 | 14 | 16 | 22 | 5.9 | 21.5 | 411 |
| p(MA/AA) | 9 followed by 1 | 21/51 | 10 | 1 | 3.3 | 14.8 | 840 |
| p(MA/AA) | 9 followed by 1 | 21/51 | 15 | 1 | 4.9 | 33.7 | 959 |
| p(MA/AA) | 9 followed by 1 | 21/51 | 20 | 0.5 | 6.3 | 31.6 | 842 |
| p(MA/AA) | 9 followed by 1 | 21/51 | 20 | 0.5 | 6.3 | 27 | 784 |
| p(MA/AA) | 9 followed by 1 | 21/51 | 20 | 1 | 6.4 | 48.7 | 1000 |

[1] = refers to polymers described in Table I
[2] = poly(ammonium acrylate) conventional treatment solution, polymer available from Nalco Chemical Company of Naperville, Illinois.

This illustrates that improved clarity is obtained using combination of the low and high molecular weight samples. Tests with addition of only the low molecular weight samples do not give settling rates in the desired range 10–50 ft/hr as indicated in Table VI.

Using the procedures described above, poly(MA/AA) copolymers of different molecular weights as treated singly are compared to conventional treatments.

TABLE VI

Settling and Clarity Performance of p(MA/AA) versus pNH$_4$Ac - Single addition of the flocculant.

| Flocculant | Polymer | RSV (dl/g) | Dosage[3] (ppm) | Settling Rate (ft/hr) | Overflow Clarity as Turbidity (NTU) |
|---|---|---|---|---|---|
| p(NH$_4$Ac)$_2$ |  | 32 | 1.91 | 15.0 | 566 |
| p(NH$_4$Ac)$_2$ |  | 32 | 1.91 | 20.0 | 803 |
| p(NH$_4$Ac)$_2$ |  | 32 | 22.3 | 33.9 | 852 |
| p(NH$_4$Ac)$_2$ |  | 32 | 2.39 | 26.4 | 733 |
| p(NH$_4$Ac)$_2$ |  | 32 | 2.55 | 38.9 | 1024 |
| p(NH$_4$Ac)$_2$ |  |  |  |  |  |
| p(NH$_4$Ac)$_2$ |  | 32 | 2.87 | 39.0 | 852 |
| p(NH$_4$Ac)$_2$ |  | 32 | 2.87 | 43.2 | 1111 |
| p(MA/AA) | 2 | 49 | 1.42 | 21.3 | 606 |
| p(MA/AA) | 2 | 49 | 1.71 | 36.3 | 659 |
| p(MA/AA) | 2 | 49 | 2.00 | 36.8 | 665 |
| p(MA/AA) | 2 | 49 | 2.28 | 39.4 | 595 |
| p(MA/AA) | 2 | 49 | 2.28 | 44.8 | 738 |
| p(MA/AA) | 5 | 34 | 1.88 | 17.0 | 501 |
| p(MA/AA) | 5 | 34 | 2.19 | 22.2 | 590 |
| p(MA/AA) | 5 | 34 | 2.88 | 23.9 | 773 |
| p(MA/AA) | 5 | 34 | 2.66 | 34.7 | 664 |
| p(MA/AA) | 5 | 34 | 2.97 | 43.6 | 759 |
| p(MA/AA) | 9 | 21 | 3.75 | 8.4 | 205 |
| p(MA/AA) | 9 | 21 | 4.69 | 9.5 | 208 |
| p(MA/AA) | 9 | 21 | 7.82 | 8.1 | 309 |
| p(MA/AA) | 9 | 21 | 7.82 | 9.2 | 310 |

TABLE VI-continued

Settling and Clarity Performance of p(MA/AA) versus pNH$_4$Ac - Single addition of the flocculant.

| Flocculant | Polymer | RSV (dl/g) | Dosage[3] (ppm) | Settling Rate (ft/hr) | Overflow Clarity as Turbidity (NTU) |
|---|---|---|---|---|---|
| p(MA/AA) | 10 | 14 | 4.69 | 7.9 | 159 |
| p(MA/AA) | 10 | 14 | 6.26 | 7.9 | 276 |

[1] = refers to polymets described in Table I
[2] = poly(ammonium acrylate) conventional treatment solution, polymer available from Nalco Chemical Company of Naperville, Illinois
[3] = polymer actives In the absence of any treatment, settling rate would be less than 1 ft/hr and clarity would be >4000 NTU for reference to Tables IV–VI.

The results in Table V show that the sequential addition produces acceptable settling rates and clarity, while a single treatment can give good clarity but not acceptable settling rates.

Changes can be made in the composition, operation and arrangement of the method of the present invention described herein without departing from the concept and scope of the invention as defined in the following claims:

We claim:

1. A method for treating Bayer process red mud-containing liquor comprising the steps of:
   a) adding first to said red mud-containing liquor an effective clarifying amount of a lower molecular weight emulsion copolymer formed from monomers methyl acrylate and acrylic acid having a mole ratio of methyl acrylate to acrylic acid of from about 85:15 to about 99.9:0.1 and wherein the lower molecular weight emulsion copolymer has an intrinsic viscosity in 2N NaNO$_3$ at 30° C. of from about 5 to about 18 dL/g; and b) adding second to said red mud-containing liquor an effective clarifying amount of a high molecular weight emulsion copolymer formed from monomers methyl acrylate and acrylic acid having a mole ratio of methyl acrylate to acrylic acid of from about 85:15 to about 99.9:0.1 wherein the high molecular weight emulsion copolymer has an intrinsic viscosity in 2N NaNO$_3$ at 30° C. of at least 20 dL/g to form a red mud phase and a clarified liquor phase and c) separating the clarified liquor phase and the red mud phase.

2. The method of claim 1 wherein said high molecular weight copolymer is from about 75 to about 80 percent hydrolyzed in said red mud-containing liquor.

3. The method of claim 1 wherein said high molecular weight copolymer has a mole ratio of methyl acrylate to acrylic acid of from about 90:10 to about 99.5:0.5.

4. The method of claim 1 wherein said high molecular weight copolymer has a mole ratio of methyl acrylate to acrylic acid of 97.5:2.5.

5. The method of claim 1 wherein the total alkalinity of the red mud containing liquor is from about 10 to about 300 grams per liter expressed as sodium carbonate.

6. The method of claim 1 wherein the solids content of the red mud containing liquor is from about 10 grams per liter to about 350 grams per liter.

7. The method of claim 6 wherein the treatment of the red mud containing liquor is conducted at a temperature of from about 30° C. to about 115° C.

8. The method of claim 1 wherein the treatment of the red mud containing liquor is conducted at a temperature of from about 5° C. to about 250° C.

9. The method of claim 1 wherein the high and low molecular weight copolymers are from about 60 to about 90 percent hydrolyzed in the red mud-containing liquor.

10. The method of claim 1 wherein the high molecular weight copolymer has an intrinsic viscosity in 2N NaNO$_3$ of from about 20 to about 40 dl/g.

11. The method of claim 1 wherein the lower molecular weight copolymer has an intrinsic viscosity in 2N NaNO$_3$ of from about 10 to about 18 dl/g.

* * * * *